2,799,621
PREPARATION OF ADRENOCORTICOTROPIN AND GONADOTROPINS FROM PITUITARY MATERIAL

Sanford L. Steelman, Elmhurst, Ill., assignor to Armour and Company, Chicago, Ill., a corporation of Illinois No Drawing. Application February 19, 1953, Serial No. 337,881

6 Claims. (Cl. 167—74)

This invention relates to the preparation of gonadotropins from pituitary residues. More particularly, this invention relates to a method of preparing gonadotropins from residues obtained in the acid acetone extraction of adrenocorticotropin (ACTH) from pituitary material. The method of this invention can be used with particular advantage in preparing the gonadotropic hormone known more specifically as the follicle-stimulating hormone (FSH) from the residues obtained by extracting the adrenocorticotropic hormone from hog pituitary glands with acidified aqueous acetone.

Gonadotropin or, more accurately, gonadotropins, are produced by the anterior lobe of the pituitary gland. This hormonal substance is known to consist of two distinct hormones, FSH (the follicle-stimulating hormone) and LH (the luteinizing hormone). ACTH is also produced by the anterior lobe of the pituitary gland.

Heretofore, methods have been known for the recovery of ACTH or gonadotropins from a single batch of pituitary material, but no satisfactory method has been known for the recovery of both ACTH and gonadotropins from the same batch of pituitary material. This presents a particularly acute problem, since the supply of pituitary glands is very limited. This is particularly true in the case of hog pituitary glands, which are rich in both ACTH and gonadotropins. However, because of the great medical importance of ACTH, the production of this hormone requires substantially all of the available hog pituitary glands, which means that the potential recovery of gonadotropins from this source material is sacrificed for the recovery of the more important ACTH.

It is therefore the principal object of this invention to provide a method for recovering both ACTH and gonadotropins from the same batch of pituitary material. Further objects and advantages will appear as the specification proceeds.

Two main extraction processes are employed in the production of ACTH. In one process, the glandular material is extracted with glacial acetic acid, while in the other process pituitary material is extracted with acidified aqueous acetone. Both of these extractions have been believed to inactivate the gonadotropins in the residue because of the acidity of the extracting solutions. Therefore, heretofore the residues in both of these processes have merely been discarded as a waste material. This invention is based in part on the discovery that gonadotropins can be recovered from the insoluble residues resulting from an acid acetone extraction of pituitary material. More specifically, it has been discovered that the gonadotropins in these residues are not permanently inactivated by the acid acetone treatment, but instead are only insolubilized, and that the gonadotropins can be extracted from the residues in good yields and at substantially full potency by a simple solubilization and extraction procedure.

The starting material for use in the process of this invention, as indicated above, is the residue or insoluble fraction obtained by the extraction of gonadotropins and adrenocorticotropin-bearing pituitary material with acidified aqueous actone to obtain an extract of adrenocorticotropin. The pituitary material used in this process is preferably whole pituitary glands, which can be either fresh or desiccated. However, the anterior lobe in either fresh or desiccated form can also be employed. The extracting solvent consists of a mixture of acetone and water containing from 50 to 85% acetone by volume, and preferably from 65 to 82% acetone by volume.

This mixture is acidified to a pH below 4 and preferably to a pH from 1 to 2. Various acids can be used for the acidification, such as the strong mineral acids. Commercially, the extraction is usually carried out with 80% acetone at a pH of around 1.5 with hydrochloric acid as the acidifying reagent. Acetone concentrations somewhat above 85%, as well as those somewhat below 50%, can be employed. However, relatively high acetone concentrations around 70 to 80% have been found to give best results. At concentrations above 85%, there is a tendency for the ACTH either not to be extracted or else to precipitate after extraction. When the concentration is increased to around 90 to 92% acetone by volume, substantially all of the ACTH will precipitate.

In the ordinary commercial operations, the ACTH extract is separated from the residue or insoluble fraction by centrifugation, although, of course, other separation procedures can be employed. The residue thus obtained in accordance with the method of this invention provides an excellent source material for gonadotropins. When the pituitary material used in the process is hog pituitary material, it has been further discovered that these residues provide a source for FSH, and that the FSH can be obtained substantially free from LH. This is an important discovery because FSH has applications which make it important to have it substantially free of LH.

It has been discovered that the gonadotropins in the ACTH-free residue obtained in the manner described above can be solubilized and extracted by subjecting the residues to an aqueous extraction at an alkaline pH. More specifically, in practicing this invention, it is preferred to treat the residues with water at a pH ranging from 7.1 to 10.0. Optimum results appear to be obtained at a pH around 8.5, or more broadly within the range from 8.0 to 9.0. These extraction conditions have been found to result in an extraction of at least 80% of the gonadotropins based on the amount of gonadotropins in the original pituitary material, and that the gonadotropins when extracted have the desired physiological activity.

The active gonadotropins thus solubilized and extracted can be recovered by known procedures. For example, the gonadotropins in the extract can be precipitated with ethanol at a concentration of from 70 to 80% by volume, and the active precipitate separated from the supernatant. Alternatively, the extract can first be partially purified by precipitating non-gonadotropins at an ethanol concentration of from about 30 to 50% by volume. After separating the precipitate, the gonadotropins can then be recovered from the supernatant in the manner just described. However, it is preferred to employ the specific purification and recovery procedure hereinafter described in detail.

As a first step in the preferred procedure, a partially purified gonadotropin preparation is obtained from the extract. This is accomplished by subjecting the extract to a purifying fractionation in which the pH of the extract is first adjusted to within the range from about 3 to 7 or, preferably, from 4 to 6, and thereafter a water-soluble zinc salt is added to a concentration ranging from .01 to 1.0 molar. This causes a precipitate to form of non-gonadotropin-active proteins, while the gonadotropins remain in solution. The precipitate is then separated from the supernatant with a resulting purification. Various water-soluble zinc salts can be employed, such as zinc acetate, zinc chloride, and zinc nitrate, but zinc acetate is preferred. The addition of the zinc salt may cause the pH of the solution to shift, but it has not been found necessary to readjust the pH when a pH within the preferred range is employed.

The gonadotropins are then recovered from the supernatant in the form of a zinc complex by adding an organic precipitating agent for proteins of sufficient concentration to precipitate the zinc complex. For example, ethanol can be added in concentrations ranging from 10 to 50% by volume, although concentrations of around 30% are usually sufficient to completely precipitate the gonadotropins. Other organic precipitating agents for proteins can be substituted for ethanol, such as the monohydroxyalkanes or aliphatic ketones having less than 4 carbon atoms.

The gonadotropin preparation thus obtained can be further purified in various ways. However, a product useful for veterinary purposes can be prepared by merely removing the zinc from the preparation. This can be done in various ways, but it is preferred to extract the zinc-containing precipitate with an aqueous phosphate solution. The extracted zinc ions will then combine with the phosphate ions in the solution to form an insoluble precipitate of zinc phosphate. Various water-soluble phosphate salts can be employed for this purpose, such as the dibasic or monobasic alkali metal phosphates. Disodium phosphate has been found to be particularly suitable. A pH of between 7 to 9 is desirable during the phosphate extraction.

It has been found that the gonadotropins can be somewhat selectively extracted while leaving other proteins insoluble in the phosphate extraction by incorporating an organic precipitating agent for proteins in the phosphate-extracting solution. The organic precipitating agents mentioned above are suitable, and ethanol will usually be preferred. When ethanol is employed, concentrations of from 25 to 55% by volume, and preferably from 35 to 45%, are desirable to effect the selective extraction.

Following the phosphate extraction, the supernatant is separated from the insoluble fraction, which will contain the zinc phosphate and preferably a considerable amount of the non-gonadotropin-active proteins. The gonadotropin can then be recovered from the supernatant by simple precipitation. For example, this can be accomplished by increasing the ethanol or other organic solvent concentration until the gonadotropins are precipitated. In the case of ethanol, this precipitation is preferably carried out at concentrations of from 65 to 80% by volume.

Alternatively, the zinc can be removed from the gonadotropin preparation described above by an ion exchange procedure or by dialyzing out the zinc in the presence of a sequestering agent.

Th purified gonadotropin preparation obtained in the manner just described, can be further purified by known methods, and/or the FSH can be further separated from the LH. For example, this can be done by dissolving the gonadotropin preparation in water and fractionating with ammonium sulphate at a pH between 4.5 and 8.0. The FSH is soluble at 0.5 saturated ammonium sulphate and insoluble at 0.7–0.8 saturation.

It will be understood that the processing steps described above will be carried out at sufficiently low temperatures to prevent denaturing of the gonadotropins and other proteins. Usually, temperatures below 10° C., and preferably below 5° C., are desirable.

This invention is further illustrated by the following examples.

Example I

In practicing the method of this invention, the following general procedure is recommended:

Whole hog pituitary glands, either fresh or desiccated, are comminuted, and then extracted with a mixture containing water and from 70 to 80% by volume of acetone, the mixture being acidified at a pH from 1 to 2 with a hydrochloric acid, and the extraction being carried out in the cold (0 to 10° C.). After several hours, when the ACTH has been substantially completely extracted, the ACTH-containing extract is separated by centrifugation from the insoluble ACTH-free residue.

The ACTH-free residue is extracted in the cold (0 to 10° C.) at an alkaline pH (7.0–10.0) with 3 or more volumes of water. After 4 or more hours of extraction the mixture is centrifuged and the insoluble matter discarded.

The supernatant is then adjusted to an acid pH between 3.0 and 6.0. Zinc acetate (or other soluble zinc salt) is added to a concentration between 0.01 and 0.1 M.

After standing several hours at 5° C. the precipitate is removed and the supernatant chilled to 0° C. At a temperature below 5° C., alcohol is added to 50% by volume. Upon completion of the alcohol addition the mixture is allowed to stand overnight at −5° C.

The alcohol precipitate is then removed and suspended at a concentration between 0.1 and 5% in a solution of 0.05 to 0.5 M dibasic phosphate pH 7.5 containing 40% alcohol. This solution should be at a temperature below 0° C. The extraction temperature should be maintained below 0° C. and continued for 4 hours or more.

Material insoluble under these conditions is removed and the alcohol concentration raised to 75%. The 75% alcohol precipitate contains the gonadotropin (primarily the follicle stimulating principle).

The precipitate is dialyzed at 0° C. for 24 hours and lyophilized. The yield of gonadotropin under the above conditions is 5–8 gms. per kilogram of wet residue. This procedure gives a product which is 20–60% electrophoretically pure FSH and contains small amounts of the luteinizing hormone (LH). It is essentially free of the other known pituitary factors.

An additional purification can be accomplished by fractionation with ammonium sulfate at pHs between 4.5 and 8.0. The FSH is soluble at 0.5 saturated ammonium sulfate and insoluble at 0.7–0.80 saturation. This purification step gives a FSH preparation which is 60–75% electrophoretically pure and contains only traces of LH.

Example II

Frozen whole hog pituitaries are comminuted and extracted in the manner described in Example I. The 70–80% acid acetone insoluble fraction contains FSH with a small amount of LH.

One kilogram of the wet acetone insoluble fraction (30–40% solids) is suspended in 10 liters of water and rapidly neutralized with 1 N NaOH to pH 8.5–9.0. After stirring for an hour at room temperature the pH is again checked and readjusted to 8.5. The mixture is then placed in a refrigerator at 0°–5° C. overnight. Slow agitation is accomplished by an electric stirrer with a rheostat.

After standing overnight the extract is centrifuged and the residue discarded. The supernatant is then adjusted to pH 4.5 with 1 N HCl and zinc acetate added to 0.02 M. The pH after the addition of the zinc acetate is usually 5.2–5.6. After standing for one hour, it is centrifuged and the residue discarded. The supernatant is then chilled to 0° C. and precooled 95% ethyl alcohol added slowly to a concentration of 50% by volume. The temperature is kept at 0° C. or below. After standing overnight at −5° C. the crude FSH is centrifuged off. The precipitate can then be solubilized with sodium citrate (5–6 grams in 500 ml. water), dialyzed to remove most of the zinc and lyophilized. The yield varies from 12–20 grams per kilogram wet residue. If further fractionation is desired the above dialysis treatment is not necessary and the precipitate can be used directly in the next step.

Example III

The FSH preparation obtained in Example II is suspended in 1.0 liters of 40% alcohol containing 0.2 M dibasic phosphate and adjusted to pH 7.4–7.5. The alcohol mixture was precooled to —5° to —10° C. After stirring the mixture for four hours at —5° C., the insoluble proteins are centrifuged and the supernatant brought to an alcohol concentration of 75%. The FSH precipitates at this point and can be removed by centrifugation. After dialysis against running tap water for 12-24 hours it is lyophilized. The yield is 5-8 grams per kilogram of wet residue.

*Example IV*

If desired, in order to further purify the FSH preparation obtained in Example III, the following ammonium sulfate fractionation may be employed: five grams of the FSH preparation is suspended in 500 ml. of 0.5 saturated ammonium sulfate solution adjusted to pH 7.4–7.5. After stirring slowly for 2–3 hours, the mixture is centrifuged and the supernatant adjusted to pH 4.8–5.0 and solid ammonium sulfate added to 0.8 saturation. The FSH precipitates and is removed, dissolved in a small amount of water, dialyzed free of salt and lyophilized. The yield is approximately 1.5–2.0 grams. The 0.5 saturated ammonium sulfate (SAS) precipitate can be re-extracted with 250 ml. of 0.5 SAS and treated as above. An additional 200–300 mgm. can be obtained in this way.

*Example V*

The biological activity of the various fractions prepared in Examples II, III, and IV were determined, and the results obtained are summarized in the following table:

|  | Example II | Example III | Example IV |
|---|---|---|---|
| FSH | 0.2–0.4 u./mg | 0.5–0.9 u./mg | 1.0 u./mg. |
| LH | 3–5% | 3–4% | 2%. |
| TSH | 0.05–0.08 USP u./mg. | 0.05–0.1 USP u./mg. | 0.05 USP u./mg. |
| ACTH | approx. 0.01 USP u./mg. | approx. 0.01 USP u./mg. | 0.01 USP u./mg. |
| Growth | Nil | Nil | Nil. |
| Prolactin | Nil | Nil | Nil. |
| Oxytocin | 0.1–0.15 USP u./mg. | 0.1–0.15 USP u./mg. | 0.02. |
| Vasopressin | 0.05–0.1 u./mg. | 0.05–0.1 u./mg. | 0.02. |
| Yield, Gm./Kg. (wet) | 12–20 gm. | 5–8 gm | 1.5–3.0 gm. |

In the foregoing specification this invention has been described both broadly and in relation to certain specific embodiments thereof. However, it is not the intention of the inventor to limit the method described herein to the specific embodiments set forth, since it will be apparent to those skilled in the art that many of the embodiments, as well as the specific details of the embodiments, can be varied widely without departing from the broad concept of the invention.

I claim:

1. The method of recovering both adrenocorticotropin and pituitary gonadotropins and purifying the pituitary gonadotropins, comprising extracting adrenocorticotropin and gonadotropins-bearing pituitary material with a mixture of water and acetone containing from 50 to 85% by volume of acetone and being acidified to a pH below 4 to obtain an extract containing adrenocorticotropin, separating the insoluble residue from the adrenocorticotropin extract, subjecting the insoluble residue to an aqueous extraction at an alkaline pH to obtain an extract containing active gonadotropins, adjusting the pH of the gonadotropin extract to a pH ranging from 3 to 7, adding a water-soluble zinc salt to the gonadotropin extract to a concentration of from .01 to 1.0 molar to precipitate a gonadotropin-inert protein fraction, separating the precipitated fraction from the supernatant, and adding an organic precipitating agent for proteins selected from the group consisting of monohydroxyalkenes and aliphatic ketones containing less than 4 carbon atoms to the supernatant to precipitate the gonadotropins in the form of a zinc complex.

2. The method of recovering both ACTH and FSH from hog pituitary material comprising extracting ACTH and FSH-bearing hog pituitary material with a mixture of water and acetone and being acidified to a pH below 4 to obtain an extract containing adrenocorticotropin, separating the insoluble residue from the adrenocorticotropin extract, subjecting the insoluble residue to an aqueous extraction at an alkaline pH to obtain an extract containing active gonadotropins, adjusting the pH of the gonadotropin extract to a pH ranging from 3 to 7, adding a water-soluble zinc salt to the gonadotropin extract to a concentration of from .01 to 1.0 molar to precipitate a gonadotropin-inert protein fraction, separating the precipitated fraction from the supernatant, and adding an organic precipitating agent for proteins selected from the group consisting of monohydroxyalkanes and aliphatic ketones containing less than 4 carbon atoms to the supernatant to precipitate the gonadotropins in the form of a zinc complex.

3. The method of claim 2 in which the organic precipitating agent added to said supernatant is ethanol, and sufficient ethanol is added to bring the concentration of the supernatant to within the range of from 10 to 50% by volume.

4. In a method of preparing both adrenocorticotropin and pituitary gonadotropins from the same pituitary material and purifying the pituitary gonadotropins, and gonadotropins-bearing pituitary material with a mixture of water and acetone containing from 50 to 85% by volume of acetone and being acidified to a pH below 4, separating the resulting adrenocorticotropin extract from the insoluble residue, extracting said insoluble residue with an aqueous solution having a pH of from 7.1 to 10.0 to obtain an extract containing active gonadotropins, adjusting the gonadotropins extract to a pH of from 4 to 6, adding a water-soluble zinc salt to the gonadotropins extract to a concentration of from 0.01 to 1.0 molar to precipitate a gonadotropins-inert protein fraction, separating said precipitate from the supernatant liquid, mixing with said supernatant liquid an organic precipitating agent for proteins selected from the group consisting of monohydroxyalkanes and aliphatic ketones containing less than 4 carbon atoms to precipitate the gonadotropins in the form of a zinc complex, and separating said precipitate from the supernatant liquid.

5. The process of claim 4 in which said water-soluble zinc salt is zinc acetate.

6. In a method of recovering both adrenocorticotropin and pituitary gonadotropins from the same batch of pituitary material and purifying the pituitary gonadotropins, wherein an adrenocorticotropin and gonadotropin-bearing pituitary material is extracted with a mixture of water and acetone containing from 50 to 85% by volume of acetone which is acidified to a pH below 4 to obtain an extract containing adrenocorticotropin and the adrenocorticotropin extract is separated from the insoluble residue, the step of subjecting said insoluble residue to an aqueous extraction at an alkaline pH to obtain an extract containing active gonadotropins.

References Cited in the file of this patent

UNITED STATES PATENTS 2,174,862    Sahyun    Oct. 3, 1939
2,362,993    Fleischer    Nov. 21, 1944

OTHER REFERENCES

White: Physiol. Reviews, October 1946, pp. 574–608, esp. pp. 574 and 599.

Pincus: Recent Progress in Hormone Res., vol. VII, 1952, Acad. Press Inc., N. Y., pp 13–15.

Kleiner: Human Biochemistry, 3rd ed., 1951, C. V. Mosby Co., St. Louis, pp. 588 and 589

Bischoff: The Amer. Jour. of Physiology, vol. 121, No. 3, March 1938, pp. 765–770.

UNITED STATES PATENT OFFICE

CERTIFICATE OF CORRECTION

Patent No. 2,799,621                      July 16, 1957

Sanford L. Steelman

It is hereby certified that error appears in the printed specification of the above numbered patent requiring correction and that the said Letters Patent should read as corrected below.

Column 6, line 26, after "same" insert -- batch of --; line 27, strike out "and purifying the pituitary gonadotropins," and insert instead --, the steps of extracting adrenocorticotropin --; line 49, strike out "batch of".

Signed and sealed this 15th day of October 1957.

(SEAL)
Attest:

KARL H. AXLINE
Attesting Officer

ROBERT C. WATSON
Commissioner of Patents